United States Patent [19]

McIntosh

[11] 3,867,574

[45] Feb. 18, 1975

[54] THREE PHASE JUMP ENCODER AND DECODER

[75] Inventor: Duane E. McIntosh, Santa Ynez, Calif.

[73] Assignee: General Motors Corporation, Detroit, Mich.

[22] Filed: Oct. 26, 1973

[21] Appl. No.: 410,271

Related U.S. Application Data

[63] Continuation-in-part of Ser. No. 371,665, June 20, 1973, abandoned.

[52] U.S. Cl. .................... 178/67, 178/66 R, 325/30

[51] Int. Cl. ........................ H04l 27/20, H04l 27/22

[58] Field of Search ........ 325/30; 178/50, 67, 66 R; 179/15 BC, 15.55; 340/347 DD; 332/9 R, 10, 16 R; 329/107, 112, 110, 126, 137

[56] References Cited

UNITED STATES PATENTS

| | | | |
|---|---|---|---|
| 3,100,890 | 8/1963 | Henning | 178/67 |
| 3,412,206 | 11/1968 | Bizet et al. | 325/30 |
| 3,430,143 | 2/1969 | Walker et al. | 178/67 |
| 3,479,457 | 11/1969 | Oswald | 178/66 R |
| 3,671,960 | 6/1972 | Sollman et al. | 178/66 R |
| 3,697,977 | 10/1972 | Sollman et al. | 178/66 R |
| 3,739,277 | 6/1973 | Schneider et al. | 325/30 |

*Primary Examiner*—Benedict V. Safourek
*Assistant Examiner*—Jin F. Ng
*Attorney, Agent, or Firm*—Albert F. Duke

[57] ABSTRACT

A method and apparatus for coding binary data is disclosed in which the coding is accomplished in a first embodiment by shifting the phase of a carrier by a first predetermined phase angle in response to detection of a pair of adjacent like bits and by a second predetermined phase angle in response to detection of the complement of the aforementioned pair of adjacent like bits. The carrier is shifted by a third predetermined phase angle in response to detection of either of the alternate three bit configurations 010 or 101. In a second embodiment the shifting of the carrier signal is in response to the two bit configurations 11, 10, and 00.

15 Claims, 16 Drawing Figures

PATENTED FEB 18 1975 3,867,574

SHEET 9 OF 9

THREE PHASE JUMP ENCODER AND DECODER

This is a continuation-in-part of my copending application Ser. No. 371,665, filed June 20, 1973, and assigned to the assignee of the present invention and now abandoned.

This invention relates to data compression techniques and more particularly to a unique method and apparatus for coding and decoding binary data.

Prior art phase encoding systems segregate the binary signal to be encoded into successive pairs of bits or dibits. There are four unique dibits, namely 00, 11, 01, and 10. The coding of the binary signal is accomplished by shifting the phase of the carrier signal by one of four predetermined phase angles depending on the dibit to be encoded. The encoded signal is decoded by comparing the phase of the carrier signal at the beginning of each dibit with the phase that existed at the beginning of the previous dibit. The phase angle by which the carrier signal is shifted is usually referred to as the "epoch angle."

The present invention represents a substantial improvement over the prior art phase encoding systems in that the number of phase angles shifts required to identify the data is substantially reduced. Rather than segregating the binary signal into dibits, the present invention proposes comparing each successive bit with the following bit to detect two of the four possible two bit configurations. The two bit configuration which may be selected are restricted to those in which the second bits of each pair of bits are complementary, i.e., 00,11; 01,10; 00,01; and 11,10. In a first embodiment the carrier signal is shifted by a first phase angle when a pair of 0's is detected and by a second phase angle when a pair of 1's is detected. During decoding the intervening alternate bit pattern is readily deducible from the state of the pair of bits following the alternate bit pattern. For bit synchronization during decoding a third phase angle shift may be assigned to the unlike pairs of adjacent bits, i.e., 01 or 10. In a second embodiment the carrier signal is shifted by a first phase angle when the two bit configuration 11 is detected and by a second phase angle when the two bit configuration 10 is detected. During decoding the intervening bit pattern necessarily includes only 0's. For bit synchronization during decoding a third phase angle may be assigned to pairs of 0's. By reducing the number of phase angle shifts from four to three, the "epoch angle" may be increased from 45° to 60° thereby permitting a more accurate detection of the data in the presence of noise.

Accordingly, it is an object of the present invention to provide an improved method and apparatus for phase encoding digital information.

It is another object of the present invention to provide a method of coding of digital information which produces a greater signal-to-noise ratio in a band limited data transmission system.

Other objects and advantages of the present invention may be had from the following detailed description which should be read in conjunction with the drawings in which:

FIGS. 1, 2, and 3 are logic diagrams of the three phase jump encoder of the present invention;

Figures 7, 8:
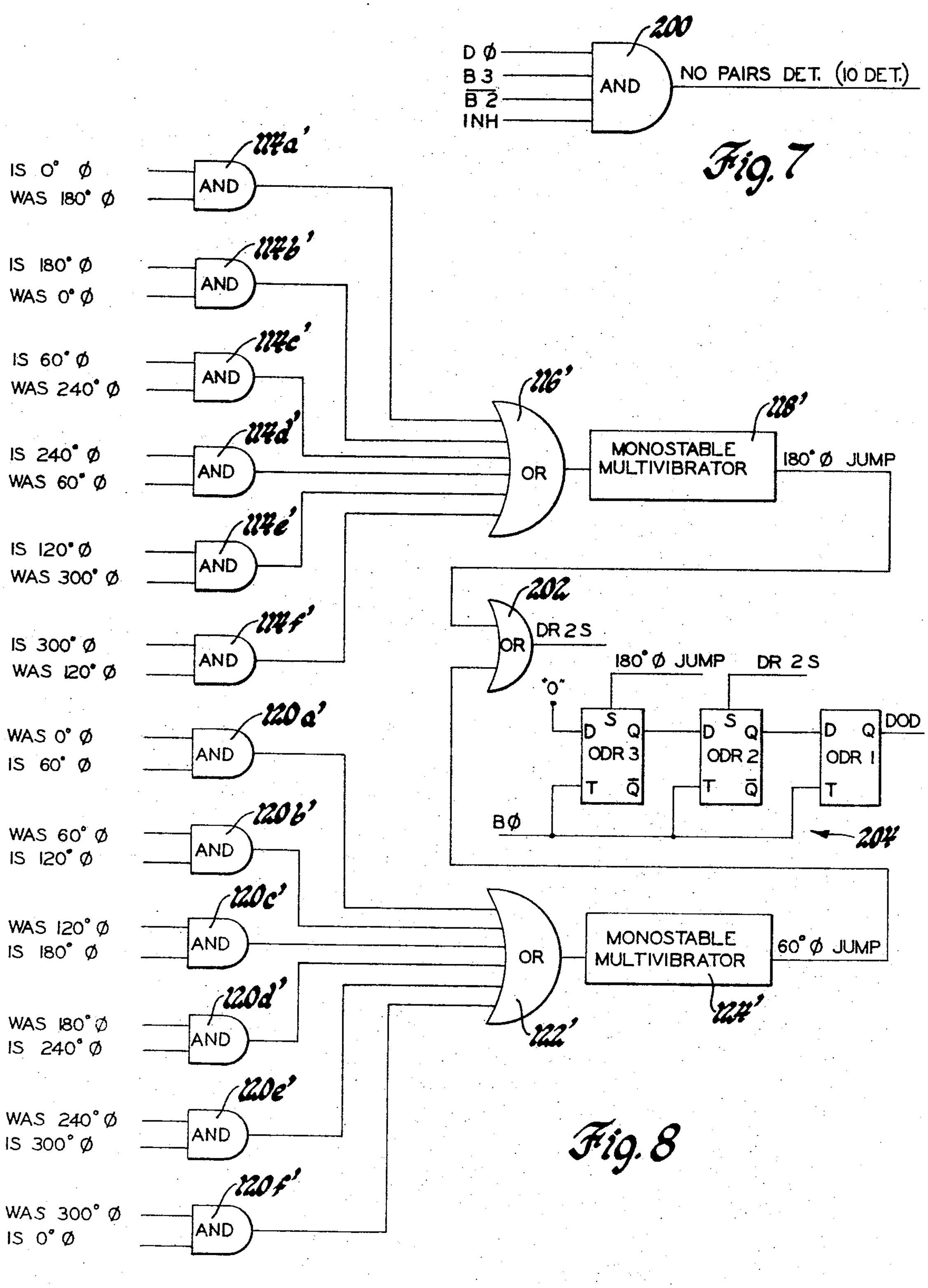
Figure 9:
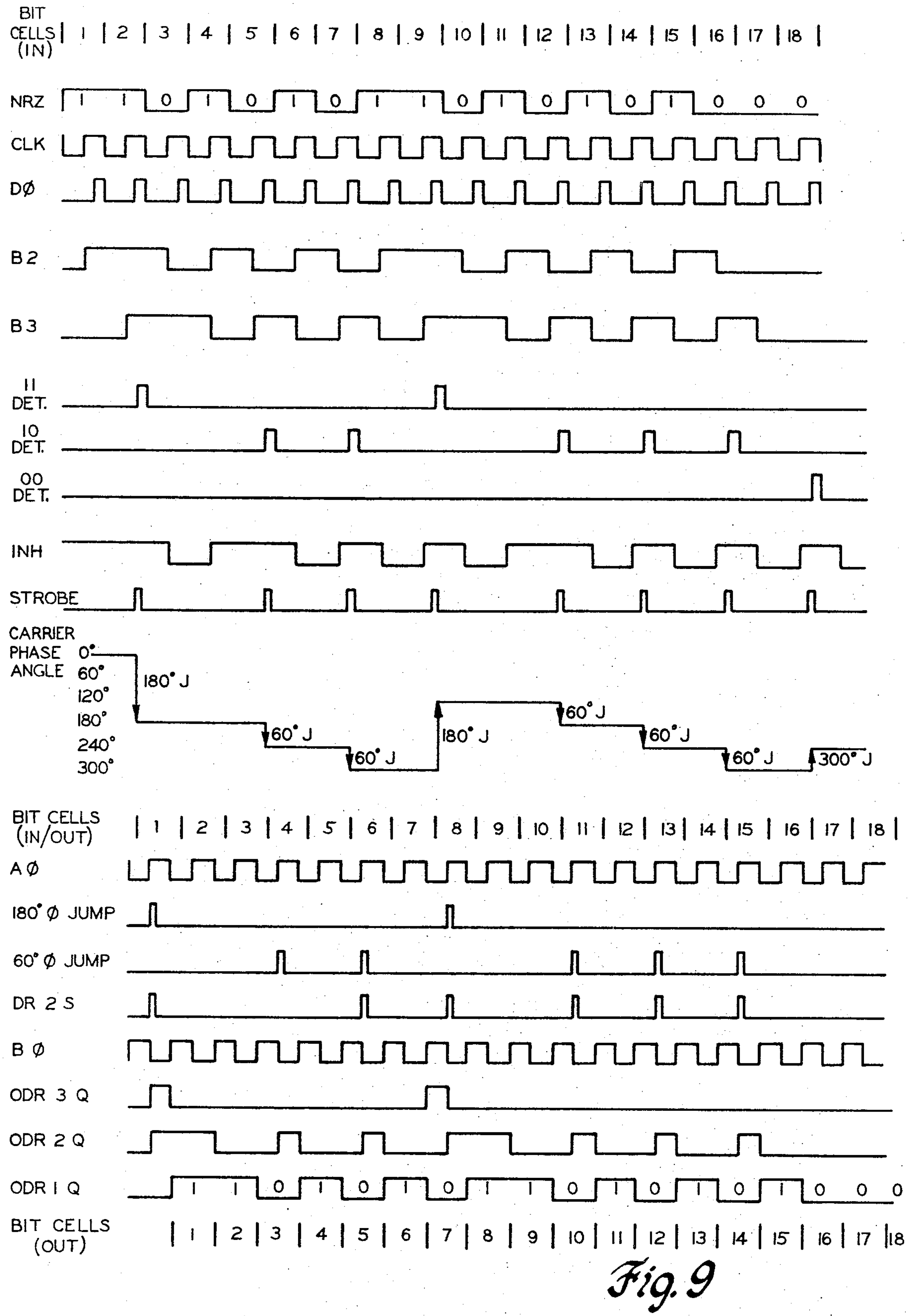

FIGS. 7 and 8 relate to modifications of the logic in FIGS. 1–5 for implementing a second embodiment of the invention;

FIG. 9 shows somewhat idealized waveforms present in the operation of the embodiment including FIGS. 7 and 8.

Figure 1A:
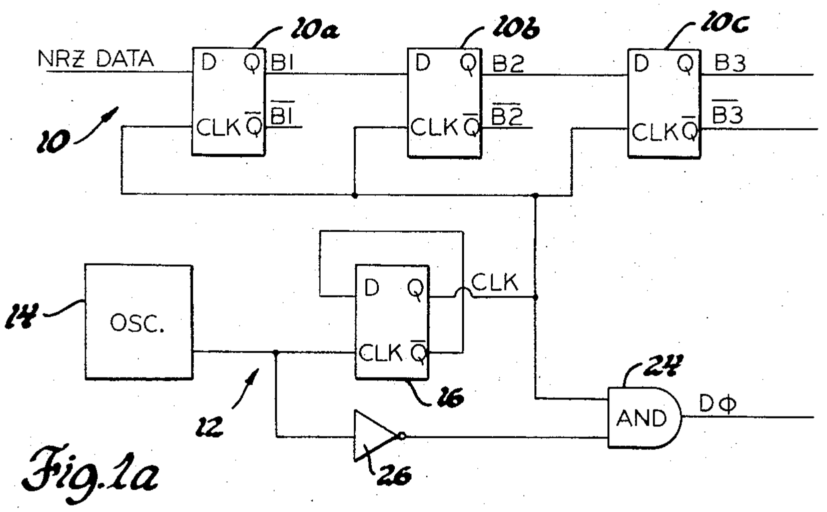

Referring now to the drawings and initially to FIG. 1*a*, the NRZ data to be phase encoded is shifted through a data register generally designated 10 which includes at least three flip-flops designated 10*a*–10*c*. The NRZ data is shifted into the register 10 by a reference clock generally designated 12 which is synchronized with the incoming NRZ data. The clock 12 comprises a twice bit rate frequency oscillator 14 and a D type flip-flop 16 which is clocked from the output of the oscillator 14. The flip-flop 16 has its D and $\overline{Q}$ outputs interconnected so that the input is divided by two to produce a square wave output designated CLK which is applied to the clock input of each of the flip-flops 10*a*–10*c*.

Figure 1B:
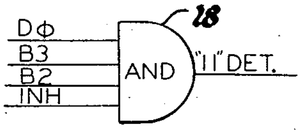
Figure 1C:
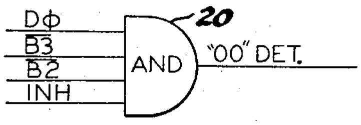
Figure 1D:
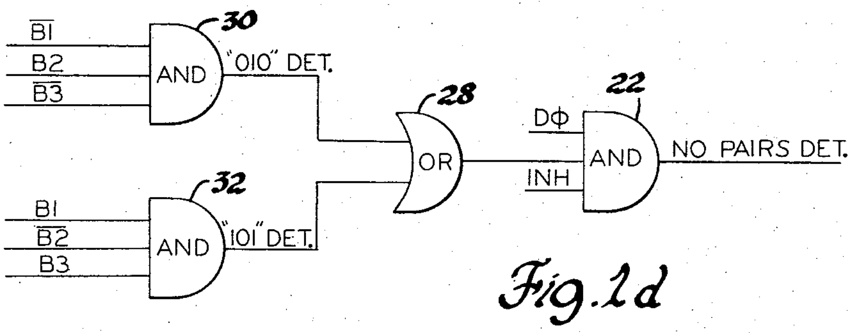

The state or logic level of the bits of NRZ data stored at the Q outputs of the flip-flops 10*a*–10*c* are designated B1, B2, and B3 respectively while their complement stored at the $\overline{Q}$ outputs thereof are designated $\overline{B1}$, $\overline{B2}$, and $\overline{B3}$. After the NRZ data is entered into the register 10 the state of the various bits of data are compared by logic circuitry shown in FIGS. 1*b*, 1*c*, and 1*d*. As shown in FIG. 1*b*, FIG. 1*c*, and FIG. 1*d*, AND gates 18, 20, and 22 have inputs designated Dφ and INH. The Dφ input is obtained from the output of an AND gate 24 having inputs connected with CLK and with the output of the oscillator 14 through an inverter 26. The rising edge of the Dφ pulse train thus occurs after each bit of NRZ data is shifted into the register 10 by CLK thereby assuring that the register is in a quiescent state before sampling of the data is commenced. The INH input to the gates 18, 20, and 22 is obtained from logic circuitry shown in FIG. 1*e* and will be described hereinafter. For the present it will be assumed that the INH input to each of the gates 18, 20, and 22 is high. The other inputs to the gate 18 are B2 and B3 while the other inputs to the gate 20 are $\overline{B2}$ and $\overline{B3}$. The output of the gates 18 and 20 are designated 11 DET. and 00 DET. respectively. The other input to the gate 22 is from the OR gate 28 having inputs connected to the outputs of AND gates 30 and 32. The inputs to the gate 30 are $\overline{B1}$, B2, and $\overline{B3}$. The input to the gate 32 is B1, $\overline{B2}$, and B3. The output of the gate 30 is designated 010 DET. while the output of the gate 32 is designated 101 DET. The output of the gate 22 is designated NO PAIRS DET.

If the register 10 contains a pair of adjacent like bits a Dφ pulse is gated through one of the AND gates 18 or 20 when the pair of adjacent like bits are stored in 10*b* or 10*c*. If the pair of adjacent like bits are 11 then the Dφ pulse will pass through the gate 18. Similarly, if the pair of adjacent like bits are 00 the Dφ pulse will pass through the gate 20. If there is no pair of adjacent like bits stored in the register 10 then the output of one of the gates 30 or 32 will be high as will the output of the gate 28 so that a Dφ pulse will pass through the gate 22. For example, if the data stored in the register 10 is 010 the output of the gate 30 will be high, similarly, if the data stored in the register 10 is 101 the output of the gate 32 will be high.

Figure 1E:
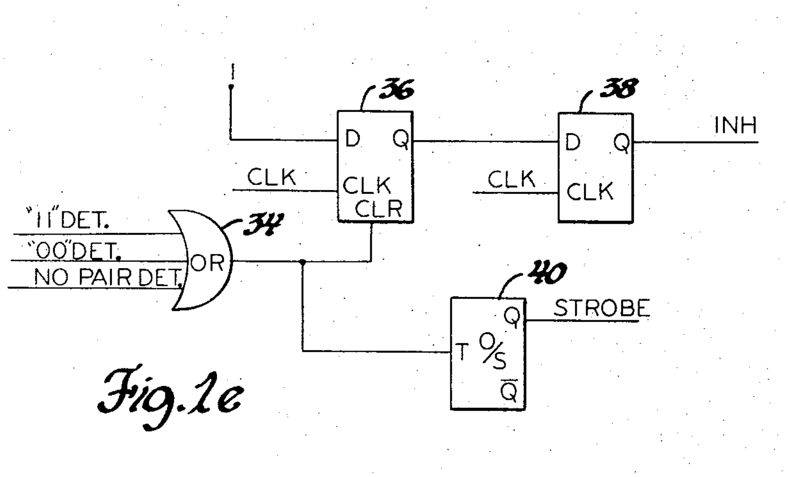

Referring now to FIG. 1*e*, circuitry is provided for inhibiting the gates 18, 20, and 22 for one bit time following detection of a pair of like bits or the detection of a three bit alternate bit pattern, i.e., 010 or 101. The circuitry includes an OR gate 34 having inputs connected with the outputs of the gates 18, 20, and 22 The output of the gate 34 is connected with the CLEAR input of a flip-flop 36 having its D input connected to a logic 1 reference. The Q output of the flip-flop 36 is connected with the D input of a flip-flop 38, the Q output of which is designated INH and is applied to each of the gates 18, 20, and 22. The flip-flops 36 and 38 are clocked from the CLK signals. When the flip-flop 36 is cleared its Q output is driven low. On the following clock pulse the output of the flip-flop 38 goes low. On the succeeding clock pulse the output of the flip-flop 38 goes high. Thus, the gates 18, 20, and 22 are inhibited for one bit time following detection of a pair of like bits or detection of the three bit alternate bit pattern. The output of the gate 34 is also utilized to trigger a one-shot multivibrator 40, the Q output of which is designated STROBE. The STROBE pulses occur shortly after the Dϕ pulses because of the delay provided by the gate 34. If desired, additional delay may be provided between the gate 34 and the one-shot 40 for internal timing purposes. The function of the logic shown in FIG. 1*d* is to insure a STROBE signal at least every three bit times and usually every two bit times for synchronization purposes during decoding of the data. For example, a three bit time interval will occur where pairs of 1's are separated by 010. In general, however, a STROBE pulse will be generated every two bit times.

Figures 2, 3A:
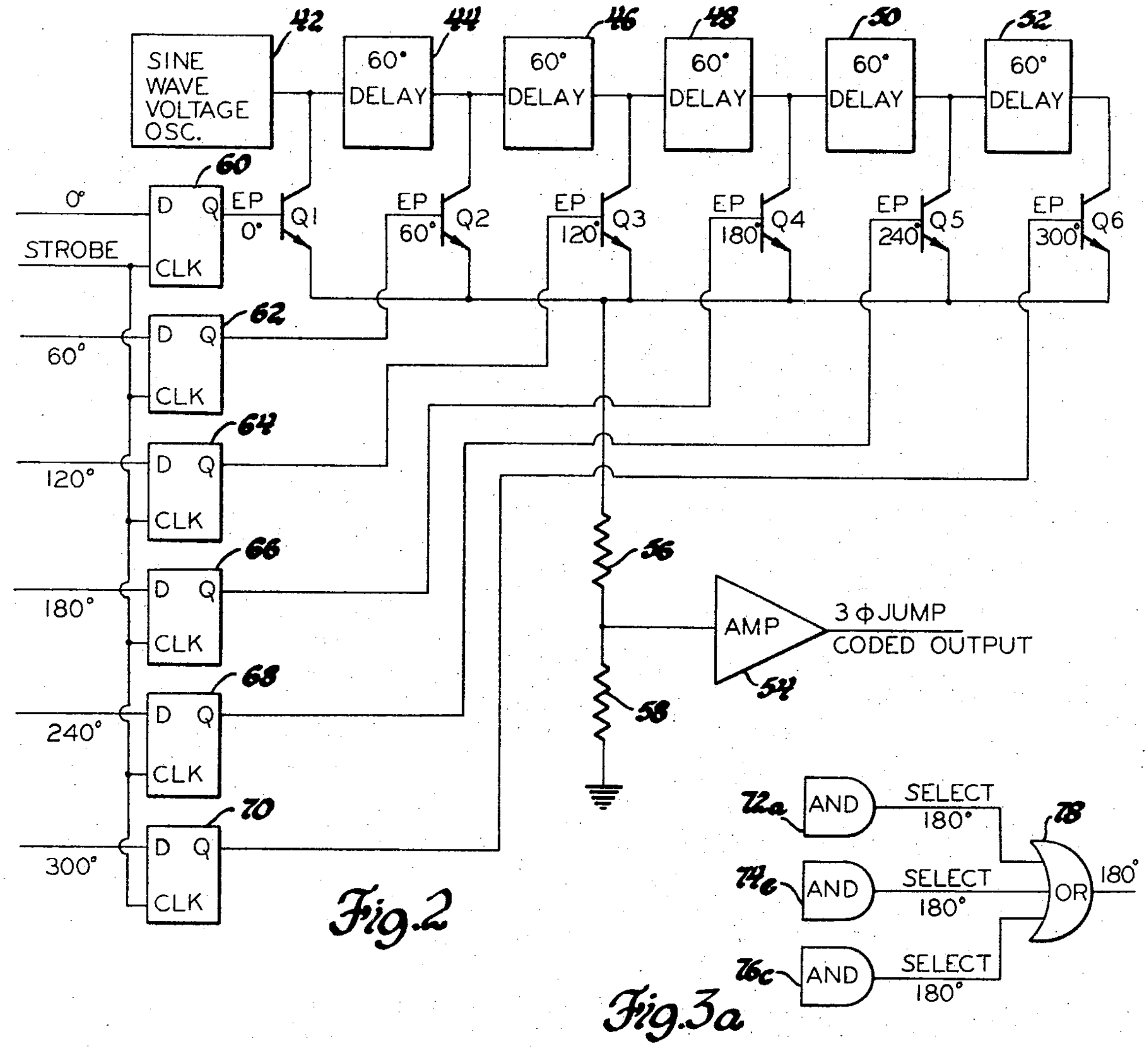

Referring now to FIG. 2, the circuitry for generating a phase coded carrier signal includes a sine wave voltage oscillator 42 and a series of 60° delay lines 44–52 which provide carrier signal reference phases in 60° increments, namely, 0°, 60°, 120°, 180°, 240°, and 300° respectively. The respective outputs of the phase generation network are selectively applied to an amplifier 54 through load resistors 56 and 58 and the emitter-collector paths of transistors Q1–Q6 respectively. The transistors Q1–Q6 are controlled by flip-flops 60–70 respectively which are clocked from the STROBE output of the one-shot 40 (FIG. 1*e*). If a logic 1 is applied to the D input of any one of the flip-flops 60–70 the corresponding transistors Q1–Q6 will be rendered conductive on the rising edge of the STROBE pulse and the particular transistor rendered conductive will remain conductive until the following STROBE pulse.

In accordance with the present invention the binary data is encoded by shifting the phase of the carrier signal by 180° upon detection of a pair of adjacent bits of the bit configuration 11; by shifting the phase of the carrier signal by 300° upon detection of a pair of adjacent bits of a bit configuration 00; and by shifting the phase of the carrier signal by 60° upon detection of either of the three bit configurations 010 or 101. The 60°, 180°, and 300° phase angle jumps have been selected to spread the phases as far apart as possible. It will be appreciated, however, that other phase angle jumps could be selected.

When the transistor Q1 is conducting the existing phase of the carrier signal is 0° and this fact is stored by the flip-flop 60 at its Q output which is designated EPO°. The Q outputs of the remaining flip-flops 62–70 are similarly designated. Thus, if it is desired to shift the phase of the carrier signal at the output of the amplifier 54 by 180°, i.e., upon detection of the 11 bit configuration, and prior to such detection the transistor Q3, for example, was conducting then the transistor Q6 must be turned on to shift the phase of the signal by 180°. In order to insure a jump of predetermined relative phase angle the phase angle of the carrier just prior to the jump must be known and this information may be obtained from the state of the flip-flops 60–70.

Figure 3:
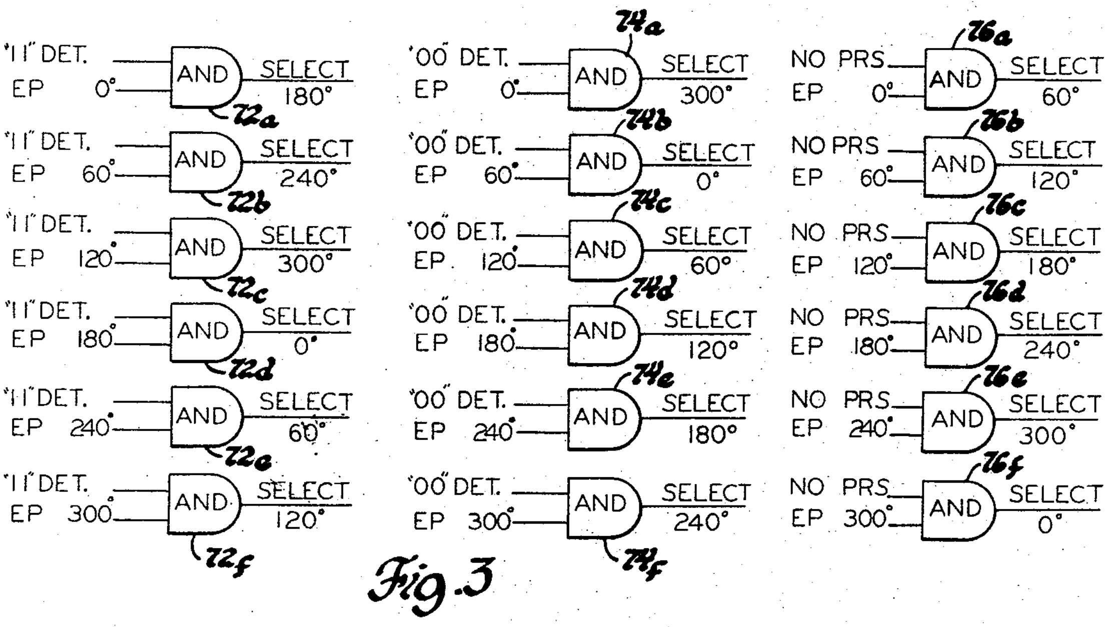

Referring now to FIG. 3, phase selection logic is disclosed for selecting the proper phase of the carrier in order to code the binary data in accordance with the aforementioned coding rules. The phase selection logic includes a plurality of AND gates **72*a*–72*f* having one input connected to the output of AND gate 18 and the other input connected with the Q outputs of the flip-flops 60–17 as indicated by the respective designations EP0° – EP300°. The outputs of the gates 72*a*–72*f* are connected with the D inputs of the flip-flops 60–70 as indicated to select the carrier phase angle which results in a phase angle jump of 180° from the phase angle of the carrier at the time the bit configuration 11 is detected. AND gates 74*a*–74*f* each have one input connected with the output of the gate 20 and the other input connected with the Q outputs of the respective flip-flops 60–70. The output of the gates 74*a*–74*d* are connected with the D inputs of the flip-flops 60–17 as indicated in order to select a carrier phase angle which results in a phase angle jump of 300° upon detection of the bit configuration 00. AND gates 76*a*–76*f* each have one input connected with the output of gate 22 and a second input connected with the Q outputs of the flip-flops 60–70. The outputs of the gates 76*a*–76*f* are connected to the D input of the flip-flops 60–70** as indicated to select a carrier phase angle which is shifted by 60° from the signal existing at the time the three bit configuration 010 or 101 is detected. As shown in FIG. 3*a*, the identically designated output of the gates **72*a*–72*f*, 74*a*–74*f*, and 76*a*–76*f* may be connected with the flip-flops 60–70 through OR gates such as the gate 78.**

Figure 4:
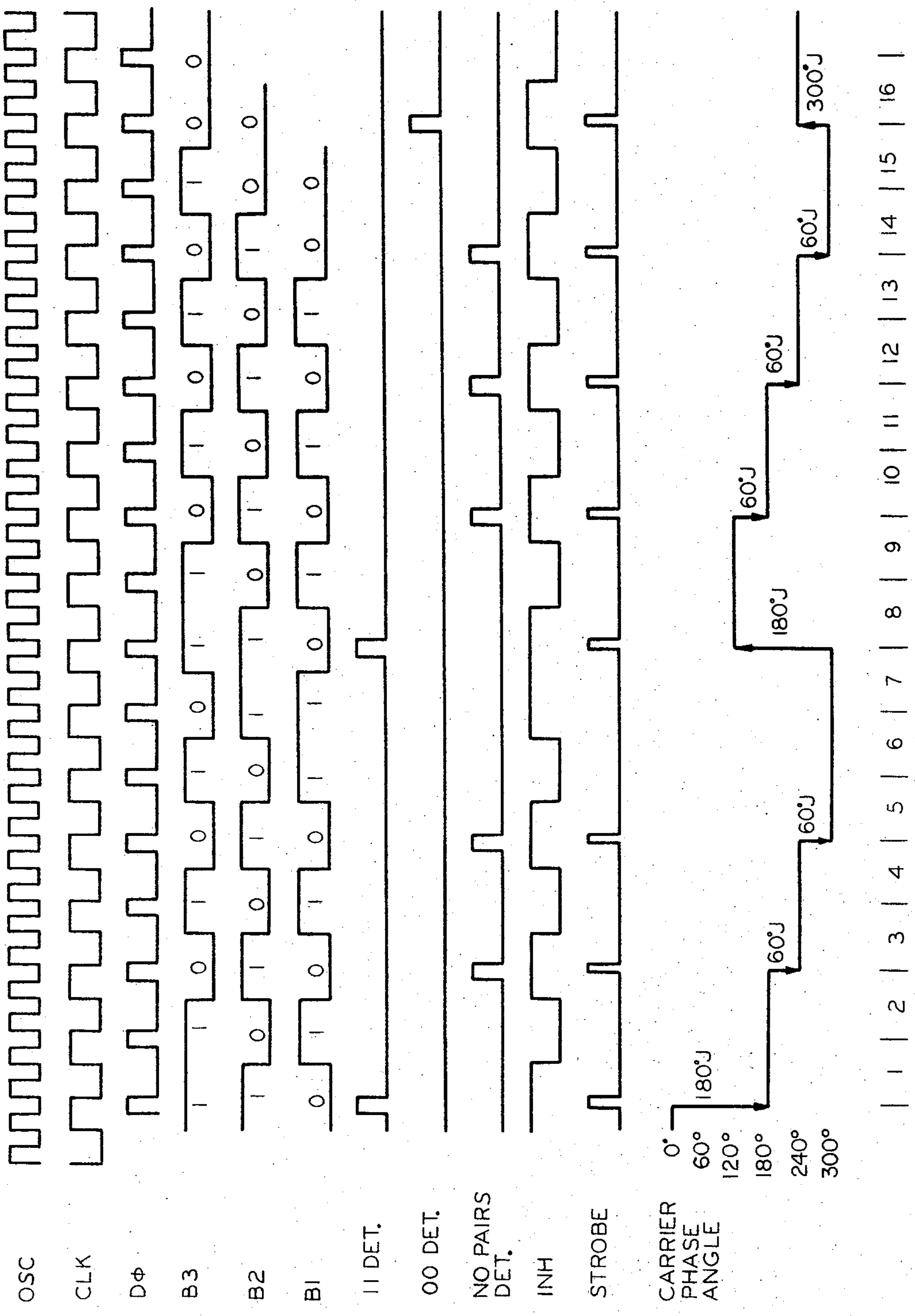
FIG. 4 shows the waveforms present at various locations in the logic diagrams of FIGS. 1–3.

Referring now to FIG. 4, the encoder waveforms generated for the NRZ input bit stream pattern 00101010110101011 is shown. The coded output signal is generated in synchronism with the STROBE pulses which establish the bit time (BT) of the output signal. The input NRZ bit stream is shifted into the register 10 by the CLK signal and the carrier is phase shifted on the leading edge of the STROBE pulses which as previously mentioned occur slightly delayed from the CLK pulses and the Dϕ pulses. For explanatory purposes the NRZ input bit stream is considered as being shifted into the register 10 beginning with the least significant bit of the aforementioned pattern and the coded output signal is generated beginning with BT1 which in the waveforms is shown as occurring after the first three bits have been entered into the register 10. Although the carrier signal is indicated as being at 0° phase initially it will be understood that this is an arbitrary selection for explanatory purposes. The initialization may be accomplished by a conventional power-on reset circuit (not shown) which sets one of the flip-flops 60–70 so that its Q output is high.

At the beginning of BT1 of the output signal the data stored at B1, B2, and B3 is respectively 011 causing the output of the gate 18 to go high. Since EP0° is high, SELECT 180° goes high. A short time interval after SELECT 180° goes high the one-shot 40 is triggered to clock the flip-flops 60–70 which turns off the previously conducting transistor Q1 and turns on the transistor Q4 causing the phase of the output signal to jump 180°. During BT2 the gates 18, 20, and 22 are inhibited by the low input from INH. EP180° is now high and at the beginning of BT3, NO PAIRS DET. goes high so that both inputs to the gate **76*d* are high and SELECT 240 goes high. Thus, on the rising edge of the succeeding STROBE pulse the transistor Q4 is turned off and the transistor Q5 is turned on causing a jump in the phase of the output signal by 60°. At the beginning of BT5, both inputs to gate 76*e* are high so that SELECT 300° is high at the time the flip-flops 60–70** are clocked producing a 60° jump in the output signal. At the beginning of BT8 a pair of 1's is detected and since the existing phase of the carrier is 300° the carrier is jumped 180° to an existing phase of 120°. At BT10, 12 and 14 the carrier signal is jumped 60° as a result of the register storing the three bit configuration 010 or 101. At the beginning of BT16 a pair of 0's is detected and the carrier signal is jumped 300+ from the existing phase of 300° to a new phase of 240°.

Figure 5:
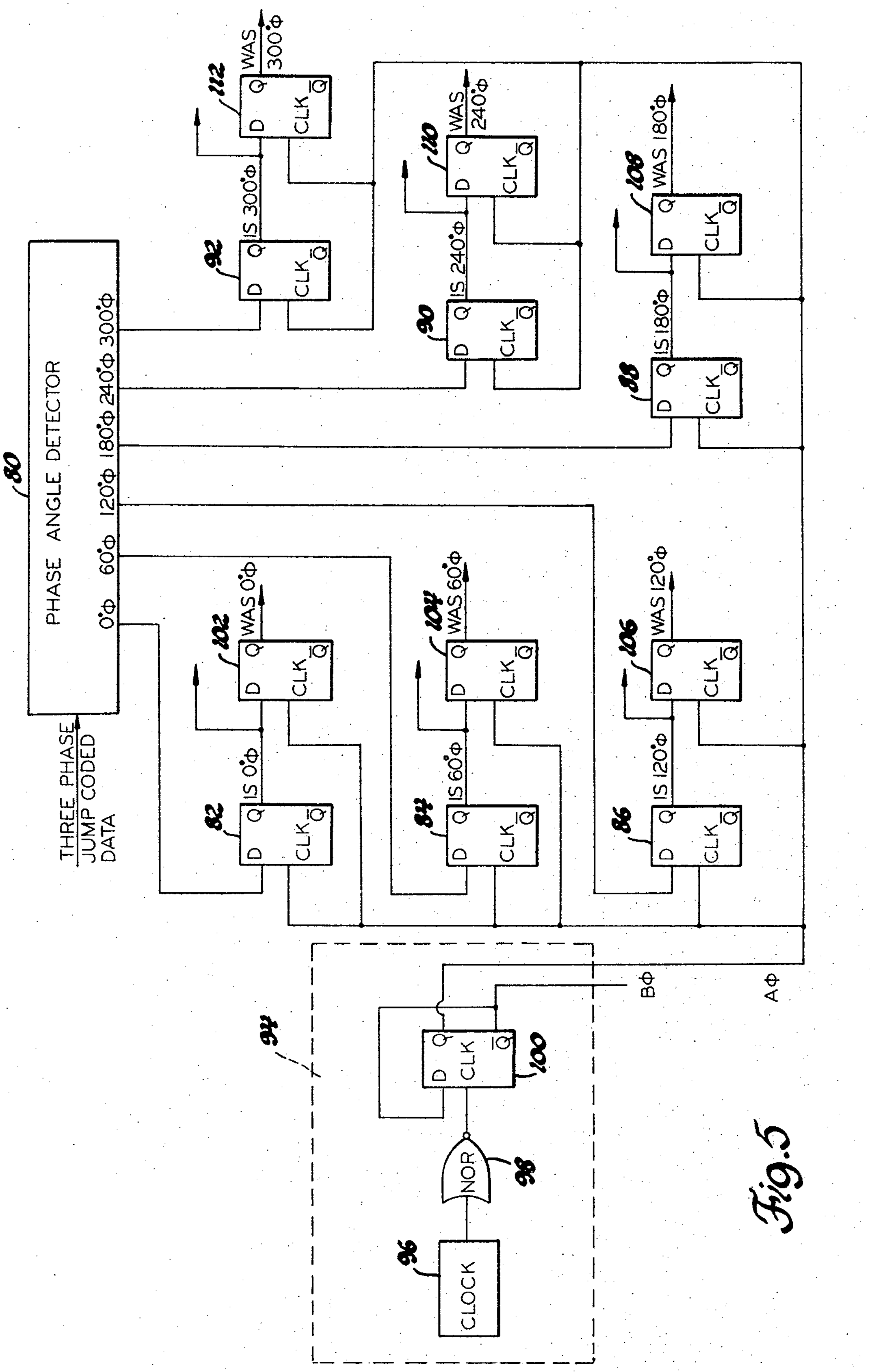
FIG. 5 is a block diagram of the decoding apparatus of the present invention.
Figure 6:
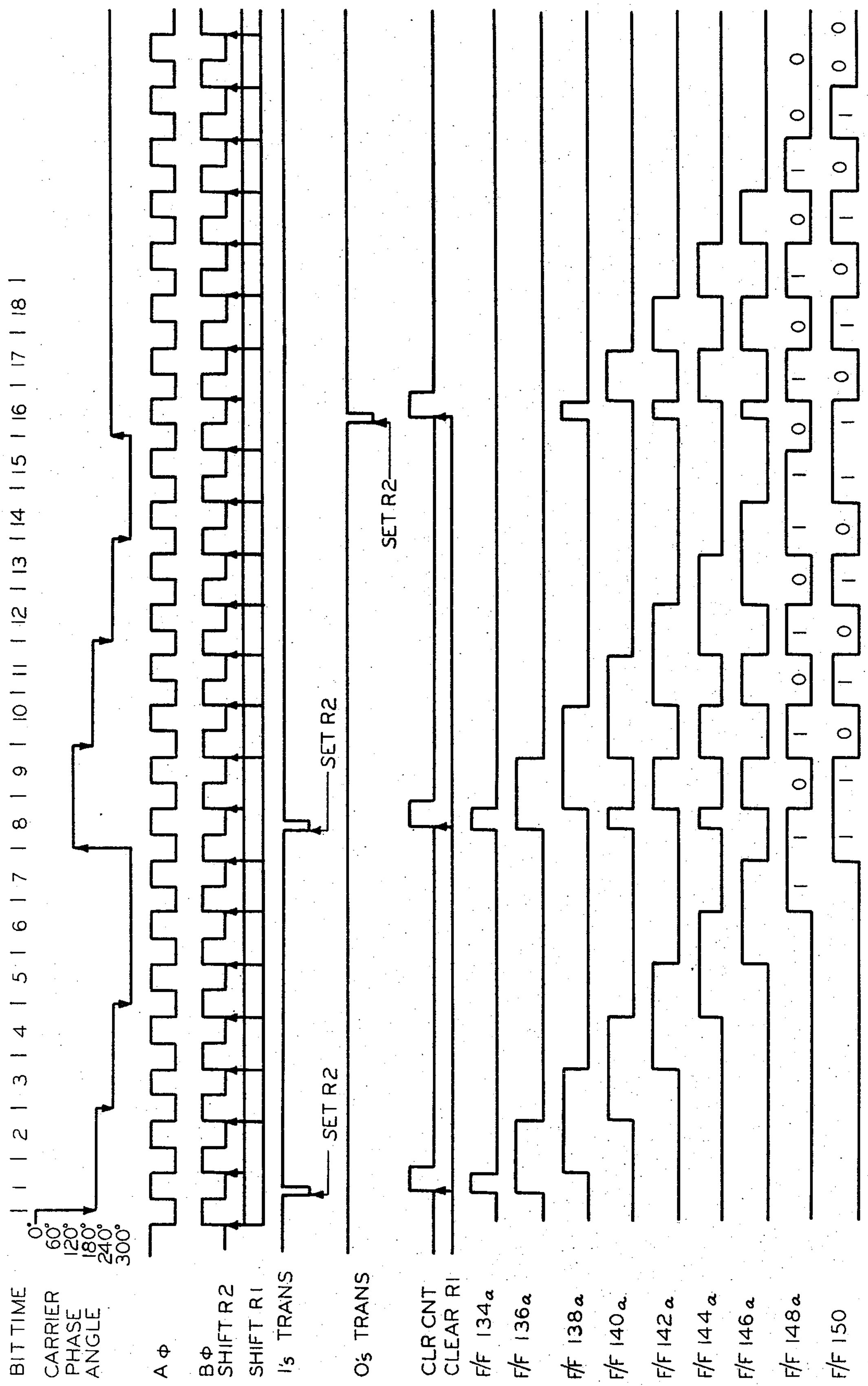
FIG. 6 shows waveforms present at various locations in the logic diagram of FIG. 5.

Referring now to FIGS. 5 and 6 the apparatus for decoding the three phase jump coded signal includes a conventional phase angle detector 80 having outputs designated 0°, 60°, 120°, 180°, 240°, and 300°. Depending on the existing phase angle of the carrier, one of the outputs of the detector 80 will be high and the remainder will be low. The outputs of the detector 80 are connected with the D inputs of flip-flops 82–92 respectively. The flip-flops 82–92 are clocked from a clock generator generally designated 94 which develops first and second clock signals designated Aφ and Bφ. The clock generator 94 includes a twice bit rate frequency clock oscillator 96 which is synchronized with the incoming coded data. The output of the clock 96 is applied through a buffer gate 98 to the clock input of a D type flip-flop 100 having its D and $\overline{Q}$ outputs interconnected and producing the Aφ and Bφ clock signals at its Q and $\overline{Q}$ outputs respectively. The Q output of the flip-flops 82–92 store the present phase of the coded signal as detected by the detector 80. The Q outputs of the flip-flops 82–92 are respectively designated IS 0° – IS 300°. The respective outputs of the flip-flops 82–92 will be driven high if the phase angle of the carrier signal is 0° - 300° respectively. The outputs of the flip-flops 82–92 are connected with the D inputs of flip-flops 102–112 which are also clocked from the Aφ clock pulse signal. The previous phase of the carrier signal is stored at the Q outputs of the flip-flops 102–112 which are designated WAS 0° - WAS 300°.

The output of the flip-flops 82–92 and 102–112 provide inputs to AND gates **114*a*–114*f* and 120*a*–120*f* as indicated. The outputs of the gates 114*a*–114*f* are OR'ed through an OR gate 116 and applied to a positive edge triggered multivibrator 118 which produces a negative going pulse synchronized with a phase jump in the carrier signal at 180° as determined by the previous and present phase of the carrier signal. The outputs of the flip-flops 82–92 and 102–112 are also connected as inputs to AND gates 120*a*–120*f* as indicated. The output of the gates 120*a*–120*f* are OR'ed through an OR gate 122 and applied to a positive edge triggered multivibrator 124 which produces a negative going pulse synchronized with a phase jump in the carrier signal of 300° as determined by the present and previous phase of the coded signal. The outputs of the multivibrators 118 and 124** are designated 1's TRANS and 0's TRANS respectively and are normally high but go low for an interval of time whenever the aforementioned logic determines that a phase jump in the carrier signal corresponds to the coding of a pair of 1's and a pair of 0's respectively.

The outputs of the multivibrators 118 and 124 are OR'ed in an AND gate 126 and applied to the D input of a flip-flop 128 which is clocked from the Bφ clock signal. The output of the gate 126 is inverted by a NOR gate 130 and applied to the CLEAR input of the flip-flop 128. The Q output of the flip-flop 128 is inverted by NOR gate 132 to provide an output pulse train designated CLRCNT which is applied to an elapsed bit time counter R1 comprising flip-flops 134–148. The CLRCNT signal is applied to the SET input of the flip-flop 134 and to the CLEAR inputs of the flip-flops 136–148. The flip-flops 136–148 are clocked from the Bφ signal. The CLRCNT signal is normally low since the input to the flip-flop 128 is normally high. However, upon receipt of a 1's TRANS or 0's TRANS pulse the flip-flop 128 is cleared to drive the CLRCNT signal high to set the flip-flops 134 and clear the flip-flops 136–148. The CLRCNT signal is driven low when the rising edge of Bφ clocks the flip-flop 128. However, due to the delays associated with the flip-flop 128 and the gate 132 the leading edge of the CLRCNT signal lags the leading edge of the 1's TRANS and 0's TRANS pulse and the falling edge of the CLRCNT signal lags the leading edge of the Bφ clock signal. Thus, the CLRCNT signal is high at the time the Bφ pulse train is applied to the clock input of the flip-flops 136–148 and the flip-flops 136–148 are not clocked until the second Bφ clock pulse following a 1's TRANS or a 0's TRANS pulse. The Bφ clock pulse train also clocks the reconstruction register R2 comprising D type flip-flops **134*a*–148*a* and 150. The flip-flops 134*a*–148*a* are set from NOR gates 152–166. The gates 152–166 have one input connected respectively with the $\overline{Q}$ output of the flip-flops 134–148. The other input of the gates 152, 154, 158, 162, and 166 are from the output of the multivibrator 118. The other input to the gates 156, 160, and 164 is the output of the multivibrator 124. The operation of the decoder will be described with reference to the waveforms shown in FIG. 6.**

The Aφ and Bφ clock signals are synchronized with the carrier signal so that the detector 80 produces a logic 1 at the appropriate flip-flops 82–92 at a time midway between transitions of the Aφ clock pulse train. Accordingly, when the coded signal is jumped by 180° at the beginning of bit times 1 and 8 the multivibrator 118 generates a 1's TRANS pulse shortly after the rising edge of the Aφ pulse train. When the coded signal jumps by 300+ at the beginning of bit time 16 the multivibrator 124 produces a negative going pulse shortly after the rising edge of the Aφ pulse train. The counter R1 is cleared by the rising edge of the CLRCNT signal which occurs shortly after the trailing edge of the 1's TRANS or 0 TRANS pulses. The counter R1 is initially placed in a condition where its $\overline{Q}$ outputs are all logic 0. This may be accomplished by the usual POWER ON initialization circuit, not shown.

Accordingly, upon production of the 1's TRANS pulse both inputs to the gates 152 and 154 are low so that the flip-flops **134*a* and 136*a* are set high. Shortly after setting of the register R2 the flip-flops 136–148 of the register R1 are cleared and the flip-flop 134 of the register R1 is set high. The registers R1 and R2 are then shifted by the B$\phi$ pulse train so that at the beginning of bit time 8 the $\overline{Q}$ outputs of the flip-flops 134, 136, 140, and 144 are low so that upon production of the 1's TRANS pulse the flip-flops 134***a*, 136*a*, 140*a*, and 144*a* are set high. After clearing the flip-flops 136–148 and setting the flip-flop 134 of the register R1 the registers R1 and R2 are shifted by the B$\phi$ pulse train so that just prior to the production of the 0's TRANS pulse the $\overline{Q}$ outputs of the flip-flops 138, 142 and 146 are all low. Accordingly, upon production of the 0's TRANS pulse the flip-flops 138*a*, 142*a*, and 146*a* are set to a logic 1 output. Thus, the setting of the flip-flops in the register R2 and the counting of the elapsed bit times between transitions by the register R2 permits a reconstruction of the original NRZ data at the output of the flip-flop 150.

Referring now to FIGS. 7–9, a second embodiment of the invention is shown. In this embodiment the two bit configurations 11 and 10 produce a shift in the phase angle of the carrier signal by 180° and 60° respectively. The two bit configuration 00 produces a shift in the phase angle of the carrier signal by 300° for bit synchronization purposes. In this embodiment the logic of FIG. 7 replaces that disclosed in FIG. 1*d* and the logic in FIG. 8 replaces that shown in FIGS. 5*a* and 5*b*. The logic shown in FIGS. 1*a*, 1*b*, 1*c*, 1*e*, 2, 3, 3*a*, and 5 is retained. In FIG. 7, AND gate 200 receives inputs from B3, $\overline{B2}$, D$\phi$, and INH and, therefore, responds to the two bit configuration 10. The output of gate 200 which replaces the logic of FIG. 1*d* retains the same output designation, i.e., NO PAIRS DET., for clarity purposes since this output is applied to the gates 76*a*–76*f* of FIG. 3. Parenthetically, the output of gate 200 is designated 10 DET.

Figure 5A:
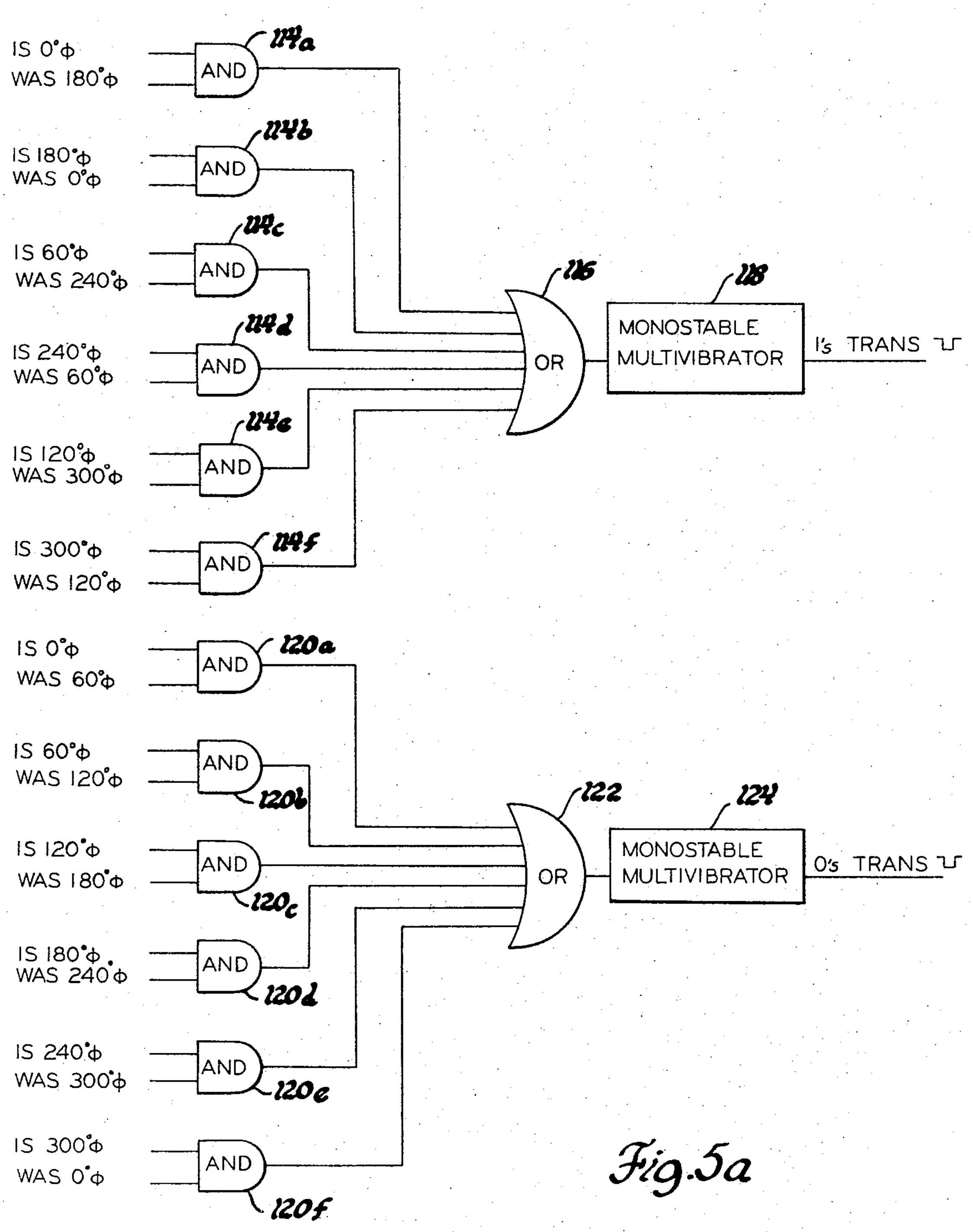
Figure 5B:
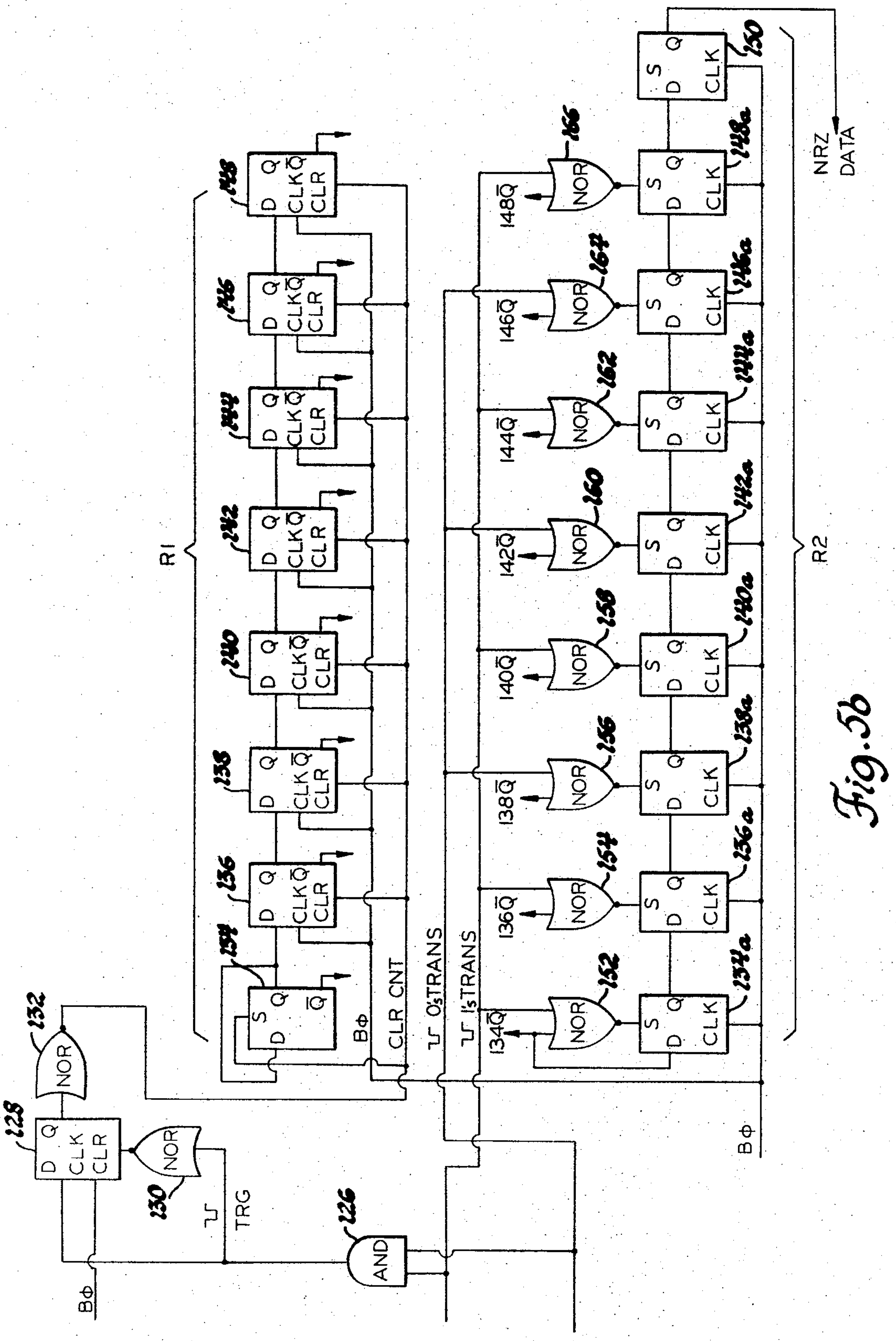

The decoder logic for the second embodiment is considerably simpler than that of the first embodiment. The logic in FIG. 5 is retained and as shown in FIG. 8, the gates 114*a*–114*f*, 116, 120*a*–120*f*, and 122 of FIG. 5*a* are retained and are designated by prime numbers. The inputs to gates 120*a*′ - 120*f*′ are different than in FIG. 5*a* so as to detect a 60° phase jump corresponding to coding of the two bit configuration 10. The monostable multivibrators 118′ and 124′ produce relatively short duration positive pulses designated 180° $\phi$ jump and 60° $\phi$ jump respectively. These outputs provide inputs to an OR gate 202 the output of which is designated DR2S. The output data register and logic shown in FIG. 5*b* is replaced by a three stage output data register generally designated 204 in FIG. 8 which comprises flip-flops ODR3, ODR2, and ODR1 which are clocked from B$\phi$. The D input of ODR3 is tied to a logic 0 and its Q output is connected with the D input of ODR2. ODR2 has its Q output connected with the D input of ODR1. The set input of ODR3 is connected with the output of the multivibrator 118′ and the set input of the flip-flop ODR2 is connected with the output of the OR gate 202. The decoded data in NRZ format appears at the Q output of ODR1 designated DOD.

Referring now to FIG. 9, somewhat idealized waveforms for the encoder and decoder of the second embodiment of the invention resulting from the coding and decoding of the 18 bits of data represented in FIG. 7 are shown. The first 17 bits of data (reading left to right) are the same as that encoded in FIG. 4 and decoded in FIG. 6. An 18th bit of data has been added so as to form a pair of 0's for explanatory purposes. 11 DET. pulses are produced by the D$\phi$ pulses occurring in bit cell 2 of the input data (BCI2) and in BCI9 as the result of the two bit configurations contained in BCI1, BCI2, and BCI8, and BCI9. 10 DET. pulses are produced during BCI5, BCI7, BCI12, BCI14, and BCI16. A 00 DET. pulse is produced during BCI18. Accordingly, the phase angle of the carrier is shifted by 180° at the beginning of bit cell 1 of the output signal (BCO1) and at the beginning of BCO8. The phae angle of the carrier is advanced by 60° at the beginning of BCO4, BCO6, BCO11, BCO13, and BCO15. A 300° phase jump occurs at the beginning of BCO17. During decoding the 180° phase jumps and the 60° phase jumps are detected as shown in the waveforms designated 180° $\phi$ jump and 60° $\phi$ jump. The 180° $\phi$ jump pulses during BCI1 and BCI8 of the coded signal cause both ODR3 and ODR2 to be set while the 60° $\phi$ jump pulses occurring during BCI4, BCI6, BCI11, BCI13, and BCI15 of the encoded waveform cause ODR2 to be set. Otherwise, 0's are shifted into the register 204 to produce the NRZ data at the Q output of ODR1 which as shown is identical with the NRZ data previously encoded.

The generation of the coded waveform in the second embodiment may be summarized as follows: Each uncoded binary 1 should produce a phase jump of the carrier signal of 180° or 60° depending upon whether the uncoded binary 1 is immediately followed by a binary 1 or a binary 0 respectively. As an aid to bit synchronization during decoding an uncoded binary 0 which is immediately followed by a binary 0 produces a phase jump of the carrier signal of 300°. During decoding a binary 1 followed by a binary 1 is produced in response to a detection of a 180° phase jump of the carrier signal and the binary 1 followed by a binary 0 is produced in response to a 60° phase jump of the carrier signal. Binary 0's are produced in all remaining bit cells.

It will be apparent to those skilled in the art that the apparatus of FIGS. 1–5 requires only minor revisions in order to encode and decode the two bit configurations 01 and 10. Similarly, only minor revisions are required in the logic of the second embodiment for encoding and decoding the two bit configurations 00 and 01.

Having thus described my invention what I claim is:

1. Apparatus for encoding binary data comprising:

storage means for storing at least two successive bits of said data;

clock means for entering said data into said storage means and for establishing the bit time interval of the encoded data, carrier signal generating means, means for shifting the phase of the carrier signal by a first or second predetermined phase angle, comparator means responsive to said clock means and to the state of said successive bits of data for detecting when said successive bits of data form the two bit configuration 11 or 00, means responsive to the detection of the two bit configuration 11 for controlling said phase shifting means to cause said carrier signal to be shifted by said first predetermined phase angle and responsive to the detection of the two bit configuration 00 for causing said phase shifting means to shift the phase of said carrier by said second predetermined phase angle, means for inhibiting said comparator means for one bit time interval following detection of the two bit configuration 11 or 00.

2. Apparatus for encoding binary data comprising:

storage means for storing at least first, second, and third successive bits of said data, clock means for entering said data into said storage means and for establishing the bit time interval of the encoded data, carrier signal generating means, means for shifting the phase of said carrier signal by a first, second or third predetermined phase angle, comparator means responsive to said clock means and to the state of said first, second and third bits for detecting the two bit configuration 11 or 00 or the three bit configuration 010 or 101, means responsive to said comparator means for controlling said phase shifting means to shift the phase of said carrier signal by said first predetermined phase angle in response to detection of the two bit configuration 11 and by said second phase angle in response to detection of the two bit configuration 00 and by said third predetermined phase angle in response to detection of the three bit configuration 010 or 101, means for inhibiting said comparator means for one bit time following detection of either of said two bit configurations or either of said three bit configurations.

3. The apparatus defined in claim 2 wherein said first predetermined phase angle is 180°, said second predetermined phase angle is 300°, and said third predetermined phase angle is 60°.

4. Apparatus for encoding binary data comprising:

data storage means for storing at least first, second, and third successive bits of data, carrier signal generating means for producing six output signals separated from each other by a 60° phase angle, first logic gate means for detecting when said first and second bits of data are 11, second logic gate means for detecting when said first and second bits of data are 00, third logic gate means for detecting when said first, second, and third bits of data are 010 or 101, means for inhibiting said first, second, and third logic gate means for one bit time following detection of either of said two or three bit configurations, phase selection logic means responsive to said first, second, and third logic gate means for selecting the appropriate output of said phase generating means to shift the phase of the carrier signal by 180° upon detection of the two bit configuration 11 and to shift the phase of the carrier signal by 300° in response to detection of the two bit configuration 00 and to shift the phase of the carrier signal by a phase angle of 60° in response to the detection of either of the three bit configurations 101 or 010.

5. Apparatus for decoding a phase jump encoded signal comprising:

phase angle detector means for detecting the phase angle of the encoded data, storage means responsive to said detector means for storing the present and previous phase angle of the encoded data, logic means responsive to the previous and present phase angle of said encoded data for developing a first control pulse train containing pulses representing a phase angle jump of the encoded data of 180°, second logic means responsive to the previous and present phase angle of said encoded data for developing a second control pulse train containing pulses representing a phase angle jump of the encoded data of 300°, formulation register means, means responsive to said first control pulse train for formulating in said register means a bit stream comprising the two bit configuration 11 followed by an alternate 01 bit pattern of length dependent on the elapsed bit time interval between a previous pulse in one of said first or second control pulse trains, means responsive to said second control pulse train for formulating in said register means a bit stream comprising the two bit configuration 00 followed by an alternate 10 bit pattern of length dependent on the elapsed bit time since a previous pulse in one of said first or second control pulse trains.

6. Apparatus for encoding binary data comprising:

clocking means for forming a plurality of bit cells of substantially uniform time durations, complementary bit pair detection means responsive to the binary data and to the clocking means for comparing the state of each bit of said data with the state of the succeeding bit of said data to produce first control pulses upon detection of discrete pairs of adjacent bits of a predetermined bit pair configuration, and produce second control pulses upon detection of discrete pairs of adjacent bits which are the complement of said predetermined bit pair configuration, controlled means for providing an output carrier signal which may be shifted from its existing phase by a first or second predetermined phase angle, said controlled means responding to said first control pulses by shifting the existing phase of said carrier signal by said first predetermined phase angle at the beginning of the first of the two bit cells containing said predetermined bit pair configuration, and responding to said second control pulses by shifting the existing phase of said carrier signal by said second predetermined phase angle at the beginning of the first of the two bit cells containing the complement of said two bit configuration, said controlled means maintaining the existing phase of the carrier signal during the bit cells preceding and following the bit cell in which the shifting of the carrier signal occurs.

7. Apparatus for encoding binary data comprising:

clocking means for forming a plurality of bit cells of substantially uniform time durations, carrier signal generating means for generating a carrier signal, logic means responsive to said binary data and to said clocking means for shifting the phase of said carrier signal by a first or second predetermined phase angle such that one bit of binary information is communicated in each of said bit cells, said logic means responding to pairs of adjacent bits forming one of the four possible two bit configurations by shifting the existing phase of said carrier signal by said first predetermined phase angle during one of the corresponding pairs of bit cells containing said pair of adjacent bits except where a phase shift has occurred in the bit cell preceding said pair of bit cells, said logic means responding to pairs of adjacent bits forming the complement of said one of the four possible two bit configurations by shifting the existing phase of said carrier signal by said second predetermined phase angle during one of the corresponding pair of bit cells containing said complement except where a phase shift has occurred in the bit cell preceding said pair of bit cells containing said complement, said logic means maintaining the existing phase of the carrier signal during the bit cells preceding and following the bit cell in which the shifting of the carrier signal occurs.

8. Apparatus for encoding binary data comprising:

clocking means for forming a plurality of bit cells of substantially uniform time durations, carrier signal generating means for generating a carrier signal, logic means responsive to said binary data and to said clocking means for shifting the phase of said carrier signal by first, second, or third predetermined phase angles such that one bit of binary information is communicated in each of said bit cells, said logic means responding to adjacent bits of binary data which are 11 by shifting the phase of said carrier signal by said first predetermined phase angle at the beginning of the first of the two bit cells containing the adjacent bits which are 11 except where the pair of bit cells are preceded by a bit cell in which a phase shift has occurred and responding to those bits of binary data which are 00 by shifting the phase of said carrier signal by said second predetermined phase angle at the beginning of the first of the two bit cells containing the pair of adjacent bits which are 00 except where said last mentioned pair of bit cells are immediately preceded by a bit cell in which a phase shift has occurred, and responding to those of said bits of binary data which form the three bit configurations of either 101 or 010 by shifting the phase of said carrier signal by said third predetermined phase angle at the beginning of the first of the three bit cells containing said three bit configurations except where the said three bit cells are immediately preceded by a bit cell in which a phase shift has occurred.

9. Apparatus for processing binary data comprising:

clocking means for forming a plurality of bit cells of substantially uniform time durations, carrier signal generating means for generating a carrier signal, logic means responsive to said binary data and to said clocking means for shifting the phase of said carrier signal by first, second, or third predetermined phase angles such that one bit of binary information is communicated in each of said bit cells, said logic means responding to adjacent bits of binary data which are 11 by shifting the phase of said carrier signal by said first predetermined phase angle at the beginning of the first of the two bit cells containing the adjacent bits which are 11 except where the pair of bit cells are preceded by a bit cell in which a phase shift has occurred and responding to those bits of binary data which are 00 by shifting the phase of said carrier signal by said second predetermined phase angle at the beginning of the first of the two bit cells containing the pair of adjacent bits which are 00 except where said last mentioned pair of bit cells are immediately preceded by a bit cell in which a phase shift has occurred, and responding to those of said bits of binary data which form the three bit configurations of either 101 or 010 by shifting the phase of said carrier signal by said third predetermined phase angle at the beginning of the first of the three bit cells containing said three bit configurations except where the said three bit cells are immediately preceded by a bit cell in which a phase shift has occurred, means for decoding said binary information from said carrier signal by responding to said phase shifts to detect the boundaries of said bit cells, said decoding means responding to phase shifts of said carrier signal of said first predetermined phase angle to register a 1 in each such bit cell and in the bit cell following such bit cell and responding to those phase shifts of said second predetermined phase angle to register a 0 in each such bit cell and in the bit cell following such bit cell, said decoding means registering either a 1 or a 0 in the remaining bit cells so that no additional pairs of adjacent like bits are registered in the remaining bit cells and the bit registered in the bit cell which precedes a bit cell containing a phase shift of said first or second predetermined phase angles is the complement of the bit registered in the bit cell in which the phase shift occurs.

10. Apparatus for encoding binary data comprising:

clock means for forming a plurality of bit cells of substantially uniform time durations, carrier signal generating means for generating a carrier signal, logic means responsive to the state of adjacent bits of said binary data and to said clock means for shifting the phase of said carrier signal by a first, second, or third predetermined phase angle, said logic means responding to each of a first pair of adjacent uncoded bits of said binary data forming the two bit configuration 11 by shifting the existing phase of said carrier signal by said first predetermined phase angle during a selected one of the bit cells containing said first pair of bits to identify the state of the two adjacent bits of data, said logic means responding to each of a second pair of adjacent uncoded bits of said binary data forming the two bit configuration 00 by shifting the existing phase of said carrier signal by said second predetermined phase angle during a selected one of the bit cells containing said second pair of bits to identify the state of the two adjacent bits of data, said logic means responding to each of a third pair of adjacent uncoded bits of said binary data forming one of the two possible two bit configurations having complementary bits, by shifting the phase of said carrier signal by said third predetermined phase angle during a selected one of the two bit cells containing said third pair of bits to identify the state of the two adjacent bits of data.

11. The apparatus defined in claim 10 wherein said encoder logic means responds to those uncoded bits of said data of said other binary character which are followed by a bit of said other binary character by shifting the phase of said carrier signal by a third predetermined phase angle.

12. The apparatus defined in claim 10 wherein said selected one of the bit cells containing said adjacent bits is the bit cell containing the first of the two adjacent bits.

13. The apparatus defined in claim 12 wherein said one of said two possible two bit configurations is 10.

14. The apparatus defined in claim 12 wherein said one of said two possible two bit configurations is 01.

15. Apparatus for encoding binary data and subsequently decoding the data comprising:

clock means for forming a plurality of bit cells of substantially uniform time durations, carrier signal generating means for generating a carrier signal, logic means responsive to said binary data and to said clock means for shifting the phase of said carrier signal by a first or second predetermined phase angle at the beginning of selected ones of the bit cells containing the bits of said data to thereby code both the binary character of the bit and the selected ones of the bit cells and the bit in the bit cell immediately following said selected bit cells, said logic means responding to those of said bits of said data of one binary character by shifting the phase of said carrier signal at the beginning of each corresponding bit cell by said first or second predetermined phase angle depending upon whether said corresponding bit cell is immediately followed by a bit cell containing a bit of said one binary character or the other binary character respectively, decoder logic means responsive to said carrier signal for registering said one binary character in each bit cell containing a phase shift of said first or second predetermined phase angle and registering said one or said other binary character in the following bit cell depending upon whether the phase shift is of said first or second predetermined phase angle, said decoder logic means registering said other binary character in each of the remaining bit cells.

* * * * *

UNITED STATES PATENT AND TRADEMARK OFFICE

CERTIFICATE OF CORRECTION

PATENT NO. : 3,867,574

DATED : February 18, 1975

INVENTOR(S) : Duane E. McIntosh

It is certified that error appears in the above-identified patent and that said Letters Patent are hereby corrected as shown below:

Column 4, line 16, "60-17" should read -- 60-70 --.
Column 4, line 26, "60-17" should read -- 60-70 --.
Column 5, line 21, "300+" should read -- $300^{\circ}$ --.
Column 6, line 55 "300+" should read -- $300^{\circ}$ --.
Column 8, line 9, "phae" should read -- phase --.

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*